Nov. 10, 1931.    I. SIKORSKY    1,831,039
AIRCRAFT INCLUDING DIFFERENTIAL AILERON CONTROL SYSTEM FOR SAME
Original Filed Dec. 30, 1929    6 Sheets-Sheet 1

Igor Sikorsky
INVENTOR
BY
ATTORNEY

Nov. 10, 1931. I. SIKORSKY 1,831,039
AIRCRAFT INCLUDING DIFFERENTIAL AILERON CONTROL SYSTEM FOR SAME
Original Filed Dec. 30, 1929 6 Sheets-Sheet 2
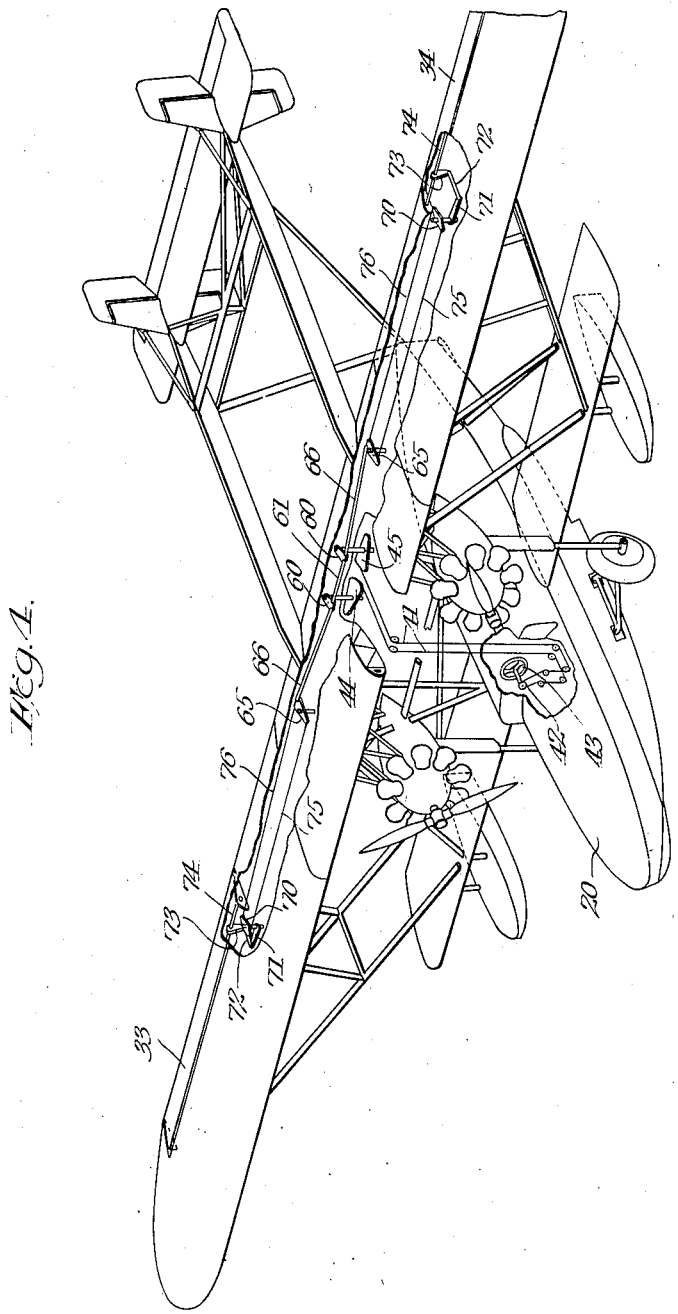
Inventor
Igor Sikorsky
Robert Kemp
Attorney Nov. 10, 1931.　　　I. SIKORSKY　　　1,831,039
AIRCRAFT INCLUDING DIFFERENTIAL AILERON CONTROL SYSTEM FOR SAME
Original Filed Dec. 30, 1929　　6 Sheets-Sheet 3
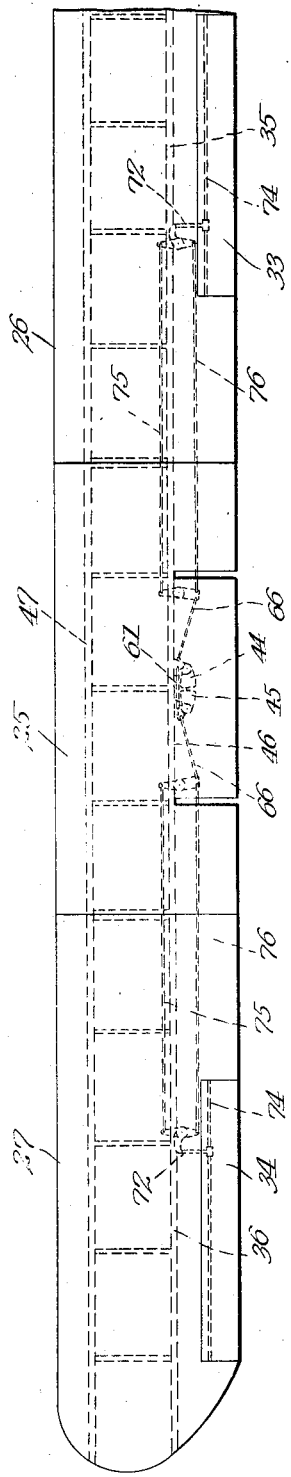
Igor Sikorsky
INVENTOR
BY Robert Kemp
ATTORNEY

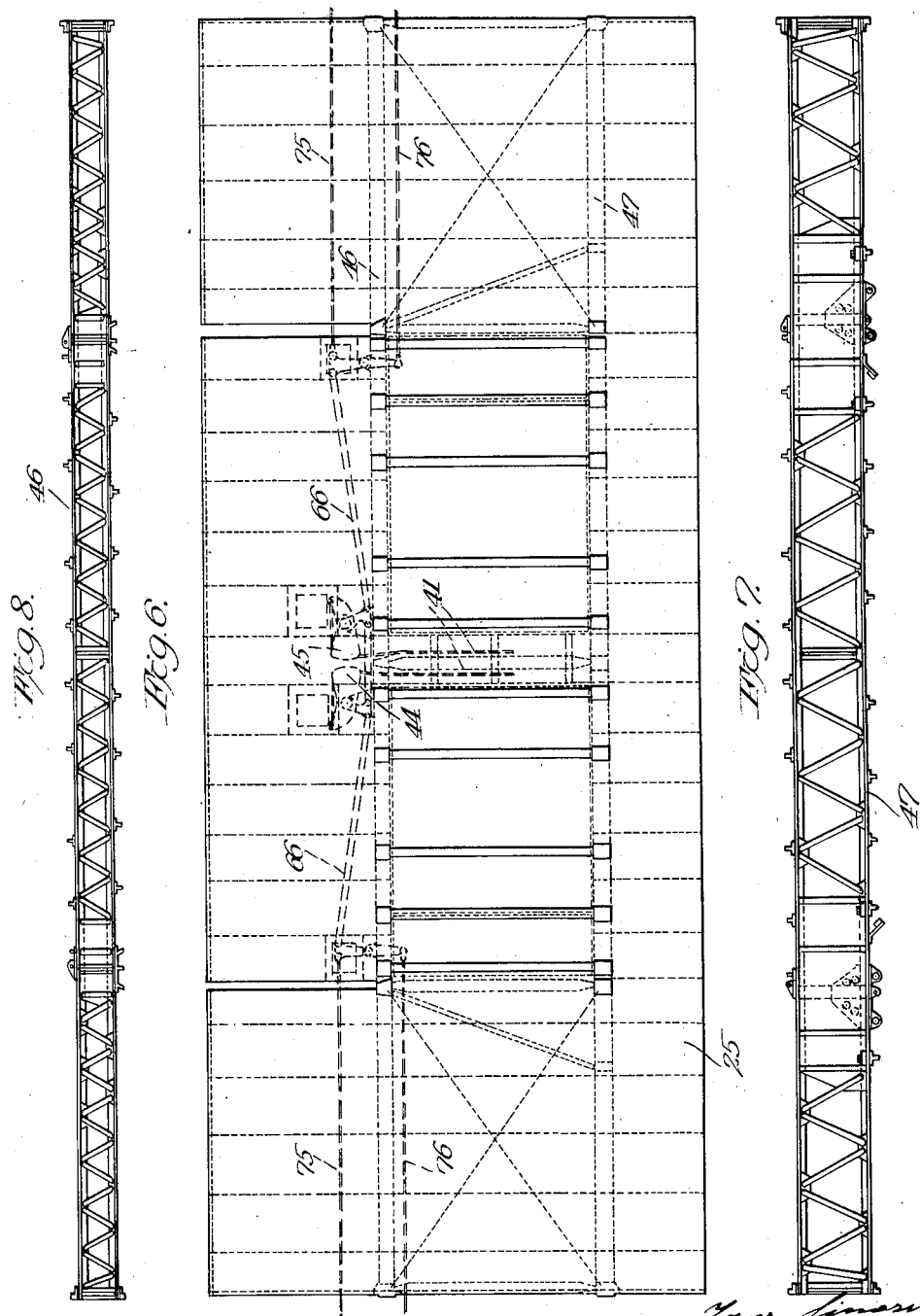

Nov. 10, 1931. I. SIKORSKY 1,831,039
AIRCRAFT INCLUDING DIFFERENTIAL AILERON CONTROL SYSTEM FOR SAME
Original Filed Dec. 30, 1929 6 Sheets-Sheet 5
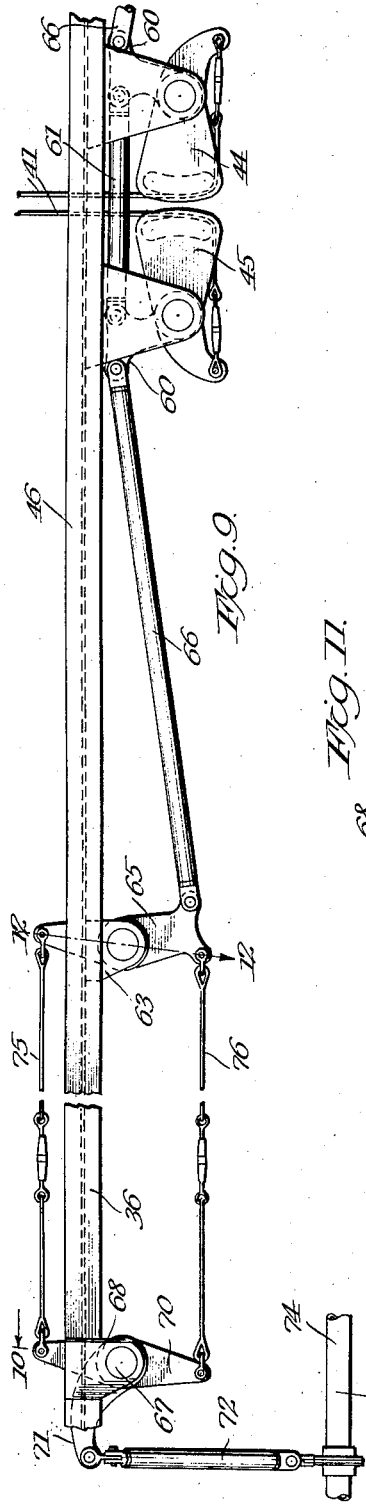
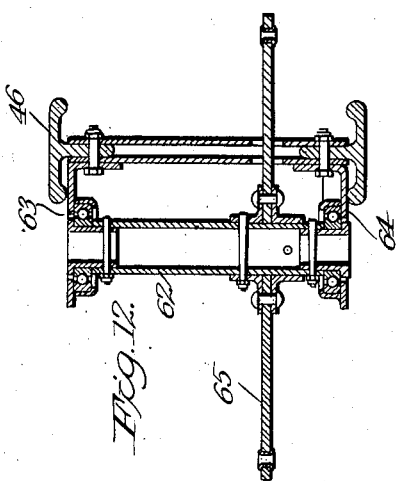
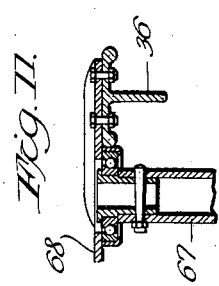
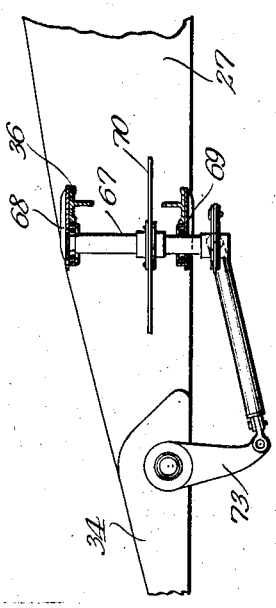
Igor Sikorsky
INVENTOR
BY
ATTORNEY Nov. 10, 1931.  I. SIKORSKY  1,831,039
AIRCRAFT INCLUDING DIFFERENTIAL AILERON CONTROL SYSTEM FOR SAME
Original Filed Dec. 30, 1929  6 Sheets-Sheet 6

Igor Sikorsky,
INVENTOR
BY Robert Kemp
ATTORNEY

Patented Nov. 10, 1931

1,831,039

UNITED STATES PATENT OFFICE

IGOR SIKORSKY, OF NICHOLS, CONNECTICUT, ASSIGNOR TO SIKORSKY AVIATION CORPORATION, OF WILMINGTON, DELAWARE, A CORPORATION OF DELAWARE

AIRCRAFT INCLUDING DIFFERENTIAL AILERON CONTROL SYSTEM FOR SAME

Application filed December 30, 1929, Serial No. 417,561. Renewed April 6, 1931.

The present invention relates to an aileron control system for aircraft of the type having a supporting aerofoil provided in the well known manner with a pair of ailerons set in the trailing edge of the aerofoil adjacent its extremities.

While the invention will be described with reference to an amphibian, according to which the main plane with which the ailerons are associated is disposed in spaced relation above a body-boat containing a control compartment, it will be understood that, in its general features, the invention is adapted for use in airplanes of all types.

In the accompanying drawings:

Figure 4 is a perspective view with parts broken away to show the aileron control mechanism.

Figure 5 is a plan view of the major portion of the main plane of the amphibian, the structural members of the plane and the aileron control element being shown in dotted lines.

Figure 6 is a plan view of the main plane center-section.

Figure 7 is an elevation of the center-section front spar.

Figure 8 is a plan view of the center-section rear spar.

Figure 9 shows in plan a portion of the rear spar of the main plane and the aileron actuating mechanism supported thereby.

Figure 10 is a section on line 10—10 of Figure 9.

Figure 11 is an enlarged section of elements appearing in Figure 10.

Figure 12 is a section on line 12—12 of Figure 9.

Figure 1:
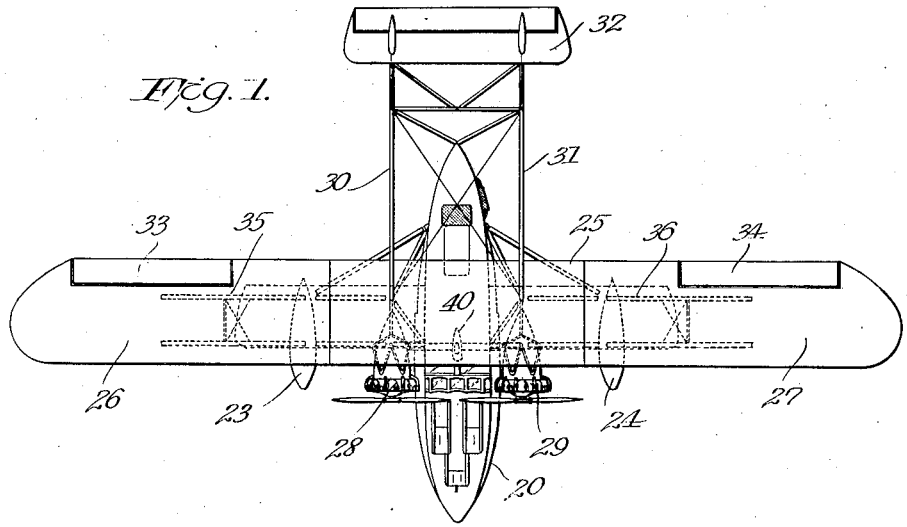
Figure 1 is a plan view of an amphibian embodying the present invention.

Referring to the drawings, reference numeral 20 indicates the body-boat of the amphibian laterally of which project lower wings 21 and 22, beneath the ends of which are suspended pontoons 23 and 24. The main plane of the amphibian is spaced considerably above the body-boat, and consists of a center-section 25 and wings 26 and 27 suitably connected to the body-boat and the lower wings.

Motors 28 and 29 are suspended beneath the main plane center-section, one at each side of the body-boat 20. In line with the motor axes, outriggers 30 and 31 project rearwardly from center-section 25 and at their rear ends support an empennage assembly indicated generally at 32. Ailerons 33 and 34 are set in the trailing edges of wings 26 and 27, and are pivotally supported from the rear spars 35 and 36 of the latter. The body-boat has pivoted thereto retractible landing wheels 37 and 38, and a tail skid 39.

Figure 2:
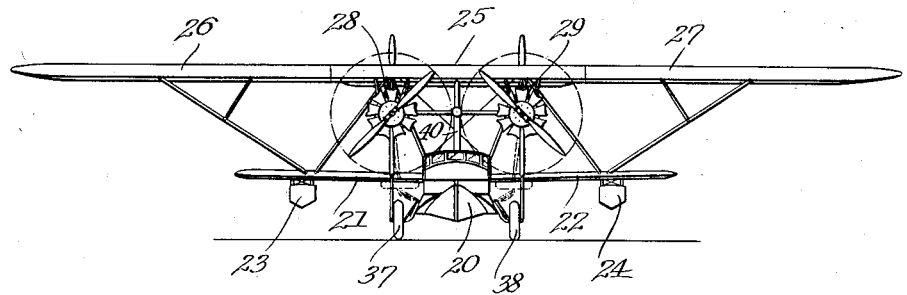
Figure 2 is a front elevation of the amphibian.
Figure 3:
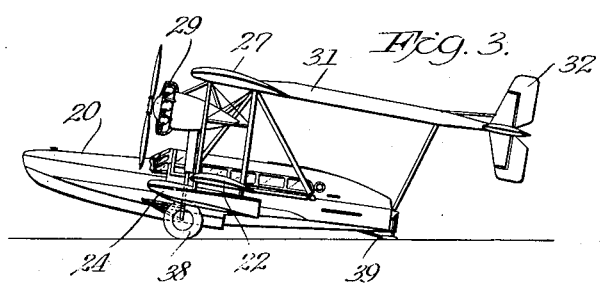
Figure 3 is a side elevation.
Figure 13:
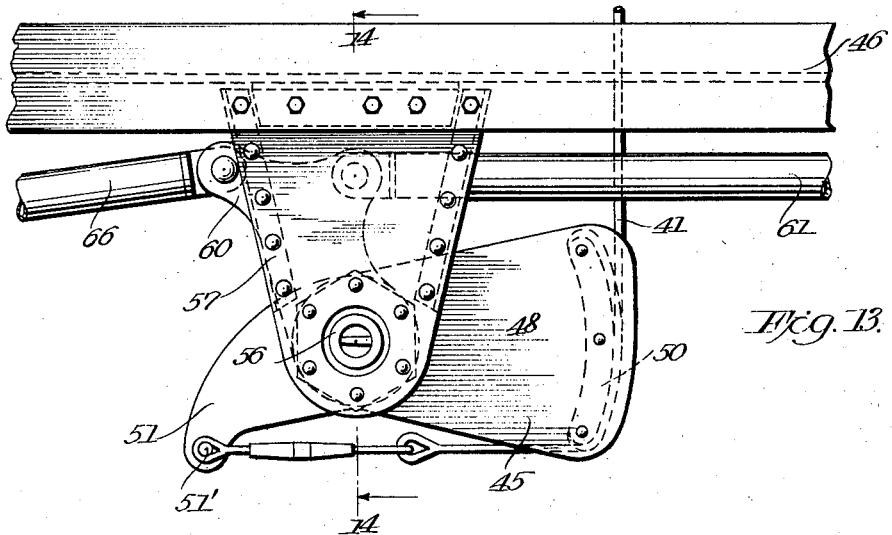
Figure 13 is a plan view of transmission elements as secured to the rear spar.
Figure 14:
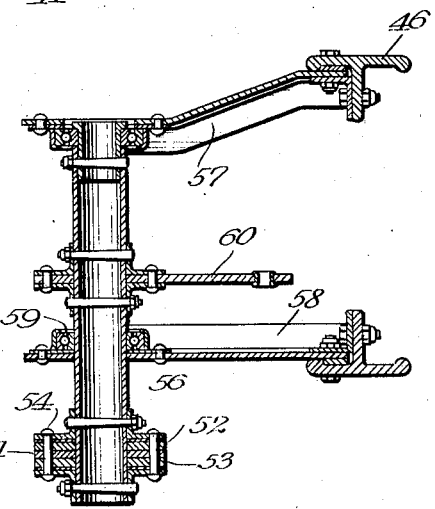
Figure 14 is a section on line 14—14 of Figure 13.
Figure 15:
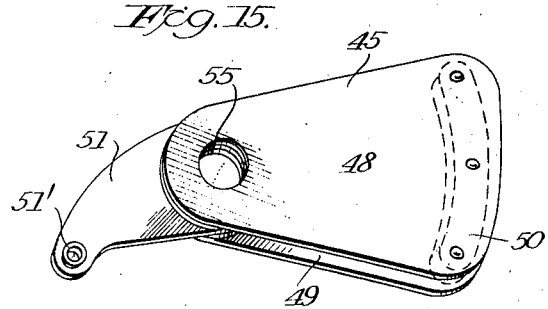
Figure 15 is a perspective of a segment and lever.
Figure 16:
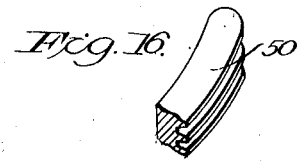
Figure 16 is a perspective in section of a part of the segment shown in Figure 15.

In Figures 1 and 2, reference numeral 40 indicates a tubular conduit extending between the roof of the body-boat and the lower surface of center-section 25 for the purpose of housing various control cables including cable 41, Fig. 4, whose center portion is wound on a drum 42 fixed to a shaft to which is likewise fixed an operating element or wheel 43 positioned in front of the pilot. Through suitable guide sheaves, the ends of cable 41 are trained first downwardly and rearwardly and then upwardly through conduit 40 to the interior of center-section 25 and then rearwardly; their extremities being secured to segments 44 and 45.

The main plane center-section, Figures 6 to 8, comprises a rear spar 46 in alignment with spars 35 and 36, these three elements together constituting a substantially integral rear spar for the main plane. The center-section has a front spar 47 in alignment with and secured to similar wing spars. Front and rear spars 47 and 46 are secured together by suitable compression and tension members, and support the wing ribs. The spars comprise top and bottom longitudinal members of T-section, the webs of these members being opposed and being interconnected by means of lattice-work.

Referring to Figures 9 to 16 for details of construction, it will be noted that segment 45, which is identical in construction with segment 44, comprises a pair of plates 48 and 49, between which is secured an arcuate block 50 provided with a pair of grooves in either of which cable 41 may lie. As a safety measure, cable 41 will preferably consist of two strands, one of which will be accommodated in each of the grooves of the block 50. Between the opposite ends of plates 48 and 49 is disposed a hook-shaped plate 51 spaced from elements 48 and 49 by means of washers 52 and 53, and secured by rivets 54. Plates and washers are pierced by an aperture 55 through which is passed the lower end of a tubular rock shaft 56, to which segment 45 is rigidly fixed. Rock shaft 56 is journalled in vertically aligned bearings formed in the projecting ends of brackets 57 and 58 secured at their other ends to the top and bottom members of spar 46. Ball bearings are provided, the inner race 59 of the lower bearing being secured to shaft 56 and constituting a step bearing. Intermediate brackets 57 and 58 a plate 60 is fixed to shaft 56 provided at its distal end with a pair of perforations.

The extremities of cable 41 are secured to studs as 51' on the segment arms, and by tensioning one of the other of the cable ends, the associated rock shaft is moved. The plates or lever arms 60 are connected by means of rigid link 61, so that the rocking of one shaft causes a positive rocking of the other shaft in the same direction.

A second rock shaft 62 is supported in brackets 63 and 64 secured to spar 46. A two armed lever 65 is fixed to shaft 62 intermediate the brackets, and to one of its arms is pivoted a rigid link 66 whose other end is pivoted to plate 60.

A third rock shaft 67 is supported in brackets 68 and 69 secured to the rear side of spar 36, this shaft likewise having secured thereto a two armed lever 70 intermediate the brackets. A lever arm 71 is secured to shaft 67 at its lower end projecting at an angle to lever 70. Lever arm 71 through suitable articulations and a rigid link 72 is connected with a lever arm 73 fixed on a horizontal member 74 of aileron 34. The ends of levers 65 and 70 are connected by means of cables 75 and 76. The control elements for aileron 33 are the same and have been given the same reference numerals.

Rotation of control element 43, of course, tensions one of the ends of cable 41 and slackens the other. Assuming the wheel to be turned to the right, the cable end in connection with segment 45 will be tensioned, and its associated shaft rocked so that aileron 34 will be lowered through the above described train of mechanism. At the same time, through link 61, the shaft associated with segment 44 will be rocked and aileron 33 raised to throw the machine into a right hand bank, as is well understood.

Having thus described my invention, what I claim is:

1. In an aircraft having an aerofoil, the combination of ailerons in hinged connection with said aerofoil and control means for said ailerons, said control means comprising a pair of rock shafts disposed in the aerofoil medially of its span, an operating element in connection with said shafts and adapted upon manipulation to rock said shafts in the same direction, a lever arm on each of said shafts, a two armed lever in the aerofoil spaced outwardly from each of said shafts, a rigid member connecting each of said rock shaft lever arms with an arm of the adjacent two armed lever, and an operating train between each of said two armed levers and the adjacent aileron, said trains including flexible members in connection with each arm of the two armed levers.

2. In an aircraft having an aerofoil and a body arranged below and medially of the span of the aerofoil, the combination of ailerons in hinged connection with said aerofoil and control means for said ailerons, said control means comprising a pair of rock shafts disposed in the aerofoil directly above said body, an operating element in the body, connections between said operating element and rock shafts whereby upon manipulation of said element said shafts are rocked in the same direction, a lever arm on each of said shafts, a two armed lever in the aerofoil spaced outwardly from each of said shafts, a rigid member connecting each of said rock shaft lever arms with an arm of the adjacent two armed lever, and an operating train between each of said two armed levers and the adjacent aileron, said trains including flexible members in connection with each arm of the two armed levers.

3. In an aircraft having an aerofoil, the combination of ailerons in hinged connection with said aerofoil and control means for said ailerons, said control means comprising a pair of parallel rock shafts disposed in the aerofoil medially of its span, opposed segments on said rock shafts, a cable length in connection with each of said segments, operating means adapted to simultaneously tension one of the cable lengths and slacken the other, positive connecting means between said shafts whereby the movement of that shaft in connection with the tensioned cable length is imparted to the other shaft, and an operating train between each of said shafts and an aileron.

4. In an aircraft having an aerofoil, the combination of ailerons in hinged connection with said aerofoil and control means for said ailerons, said control means comprising a pair of parallel rock shafts disposed in the aerofoil medially of its span, opposed segments on said rock shafts, a cable length in connection with each of said segments, operating means adapted to simultaneously tension one of the cable lengths and slacken the other, a lever arm secured to each of said shafts, said arms projecting in the same direction, a rigid link connecting said arms whereby the movement of that shaft in connection with the tensioned cable is imparted to the other shaft, and an operating train between each of said shafts and an aileron.

5. In an aircraft having an aerofoil, the combination of ailerons in hinged connection with said aerofoil and control means for said ailerons, said control means comprising a pair of parallel rock shafts disposed in the aerofoil medially of its span, opposed segments on said rock shafts, a cable length in connection with each of said segments, operating means adapted to simultaneously tension one of the cable lengths and slacken the other, a lever arm secured to each of said shafts, said arms projecting in the same direction, a rigid link connecting said arms whereby the movement of that shaft in connection with the tensioned cable is imparted to the other shaft, and an operating train between each of said arms and an aileron.

6. In an aircraft having an aerofoil and a body arranged below and medially of the span of the aerofoil, the combination of ailerons in hinged connection with the aerofoil and control means for said ailerons, said control means comprising an operating element in the body, a pair of vertical rock shafts in the trailing portion of the aerofoil, means connecting said shafts for communicating the rocking movement of each to the other, a segment on each of said shafts, a cable length connecting each of said segments with the operating element, means in the aerofoil for guiding the cable lengths upwardly from the operating element and rearwardly in the aerofoil to said segments, and an operating train between each of said shafts and an aileron.

7. In an aircraft having an aerofoil, the combination of an aileron in hinged connection with the aerofoil and control means for said aileron, said means including a vertical rock shaft in the aerofoil forward of the aileron, a horizontal structural member in the aileron, lever and link connecting means between the rock shaft and structural member, an operating element, and an operating train between said element and said shaft.

8. In an aircraft, an aerofoil including front and rear spars, an aileron pivotally supported by the rear spar, and aileron actuating means including a series of vertical rock shafts supported by the rear spar.

9. In an aircraft, an aerofoil including front and rear spars, an aileron pivotally supported by the rear spar, a series of brackets projecting from the rear spar, and aileron control means including vertical rock shafts journalled in said brackets.

10. In an aircraft, an aerofoil including front and rear spars, the rear spar comprising top and bottom longitudinal members and a lattice-work web, an aileron pivotally supported by the rear spar, a series of pairs of brackets projecting rearwardly of the rear spar, one bracket of each pair being secured to said top member and the other to the bottom member, and aileron control means including vertical rock shafts journalled in said brackets.

11. In an aircraft having an aerofoil, the combination of ailerons in hinged connection with said aerofoil and control means for said ailerons, said control means comprising a pair of rock shafts disposed in the aerofoil medially of its span, an operating element in connection with said shaft and adapted upon manipulation to rock said shafts in the same direction, a lever arm on each of said shafts, a two armed lever in the aerofoil spaced outwardly from each of said shafts, a rigid member connecting each of said rock shaft lever arms with an arm of the adjacent two armed lever, a further rock shaft in the aerofoil forward of each aileron and having fixed thereto a two armed lever and a single armed lever, cables connecting the first and last named two armed levers, a lever projecting from each aileron, and a link connecting said last named levers and said single armed levers respectively.

Signed at College Point, Long Island, in the county of Queens and State of New York, this 2nd day of November A. D. 1929.

IGOR SIKORSKY.